US011475090B2

(12) United States Patent
Rozhnov

(10) Patent No.: US 11,475,090 B2
(45) Date of Patent: Oct. 18, 2022

(54) METHOD AND SYSTEM FOR IDENTIFYING CLUSTERS OF AFFILIATED WEB RESOURCES

(71) Applicant: GROUP-IB GLOBAL PRIVATE LIMITED, Singapore (SG)

(72) Inventor: Ilia Rozhnov, Singapore (SG)

(73) Assignee: GROUP-IB GLOBAL PRIVATE LIMITED, Singapore (SG)

( * ) Notice: Subject to any disclaimer, the term of this patent is extended or adjusted under 35 U.S.C. 154(b) by 160 days.

(21) Appl. No.: 16/937,233

(22) Filed: Jul. 23, 2020

(65) Prior Publication Data
US 2022/0019630 A1   Jan. 20, 2022

(30) Foreign Application Priority Data
Jul. 15, 2020 (SG) .......................... 10202006752V

(51) Int. Cl.
*G06F 16/00* (2019.01)
*G06F 16/954* (2019.01)
(Continued)

(52) U.S. Cl.
CPC .......... *G06F 16/954* (2019.01); *G06F 16/958* (2019.01); *G06F 16/9566* (2019.01); *G06F 17/18* (2013.01)

(58) Field of Classification Search
CPC ................................ G06F 16/95; G06F 17/18
See application file for complete search history.

(56) References Cited

U.S. PATENT DOCUMENTS 7,225,343 B1    5/2007  Honig et al.
7,457,725 B1   11/2008  Civilini
(Continued)

FOREIGN PATENT DOCUMENTS

CN   106131016 A      11/2016
CN   107135092 A  *   9/2017   ........... G06K 9/6223
(Continued)

OTHER PUBLICATIONS

English Abstract of RU 107616 retrieved on Espacenet on Jul. 3, 2017.
(Continued)

*Primary Examiner* — Leslie Wong
(74) *Attorney, Agent, or Firm* — BCF LLP

(57) ABSTRACT

A method and a system for determining affiliation of a web resource to a plurality of clusters are provided. The method includes: at a training stage: detecting a plurality of web resources; retrieving information associated with the plurality of web resources; generating a respective pattern based on the information; grouping the plurality of web resources into the plurality of clusters, based on the respective pattern; at a run-time stage: receiving an indication of a given web resource; retrieving the information about the given web resource; generating a new pattern of the given web resource; analyzing pattern affiliation of the new pattern with a specific one from the plurality of clusters of web resources; calculating an affiliation ratio therewith; in response to the affiliation ratio exceeding a predetermined threshold value, associating the given web resource with the specific one of the plurality of clusters.

10 Claims, 7 Drawing Sheets

(51) Int. Cl.
*G06F 16/958* (2019.01)
*G06F 16/955* (2019.01)
*G06F 17/18* (2006.01)

(56) References Cited

U.S. PATENT DOCUMENTS

| | | | |
|---|---|---|---|
| 7,496,628 B2 | 2/2009 | Arnold et al. | |
| 7,712,136 B2 | 5/2010 | Sprosts et al. | |
| 7,730,040 B2 | 6/2010 | Reasor et al. | |
| 7,865,953 B1 | 1/2011 | Hsieh et al. | |
| 7,958,555 B1 | 6/2011 | Chen et al. | |
| 7,984,500 B1 | 7/2011 | Khanna et al. | |
| 8,132,250 B2 | 3/2012 | Judge et al. | |
| 8,151,341 B1 | 4/2012 | Gudov | |
| 8,255,532 B2 | 8/2012 | Smith-Mickelson et al. | |
| 8,260,914 B1 | 9/2012 | Ranjan | |
| 8,285,830 B1 | 10/2012 | Stout et al. | |
| 8,402,543 B1 | 3/2013 | Ranjan et al. | |
| 8,448,245 B2 | 5/2013 | Banerjee et al. | |
| 8,521,667 B2 | 8/2013 | Zhu et al. | |
| 8,532,382 B1 | 9/2013 | Ioffe | |
| 8,539,582 B1 | 9/2013 | Aziz et al. | |
| 8,555,388 B1 | 10/2013 | Wang et al. | |
| 8,561,177 B1 | 10/2013 | Aziz et al. | |
| 8,600,993 B1 | 12/2013 | Gupta et al. | |
| 8,612,463 B2 | 12/2013 | Brdiczka et al. | |
| 8,625,033 B1 | 1/2014 | Marwood et al. | |
| 8,635,696 B1 | 1/2014 | Aziz | |
| 8,650,080 B2 | 2/2014 | O'Connell et al. | |
| 8,660,296 B1 | 2/2014 | Ioffe | |
| 8,677,472 B1 | 3/2014 | Dotan et al. | |
| 8,776,229 B1 | 7/2014 | Aziz | |
| 8,850,571 B2 | 9/2014 | Staniford et al. | |
| 8,856,937 B1 | 10/2014 | Wüest et al. | |
| 8,972,412 B1 | 3/2015 | Christian et al. | |
| 8,984,640 B1 | 3/2015 | Emigh et al. | |
| 9,060,018 B1 | 6/2015 | Yu et al. | |
| 9,210,111 B2 | 12/2015 | Chasin et al. | |
| 9,215,239 B1 | 12/2015 | Wang et al. | |
| 9,253,208 B1 | 2/2016 | Koshelev | |
| 9,330,258 B1 | 5/2016 | Satish et al. | |
| 9,357,469 B2 | 5/2016 | Smith et al. | |
| 9,456,000 B1 | 9/2016 | Spiro et al. | |
| 9,654,593 B2 | 5/2017 | Garg et al. | |
| 9,723,344 B1 | 8/2017 | Granström et al. | |
| 9,736,178 B1 | 8/2017 | Ashley | |
| 9,917,852 B1 | 3/2018 | Xu et al. | |
| 9,934,376 B1 | 4/2018 | Ismael | |
| 10,771,477 B2 * | 9/2020 | Xu | H04L 67/2819 |
| 2002/0161862 A1 | 10/2002 | Horvitz | |
| 2003/0009696 A1 | 1/2003 | Bunker et al. | |
| 2006/0074858 A1 | 4/2006 | Etzold et al. | |
| 2006/0107321 A1 | 5/2006 | Tzadikario | |
| 2006/0224898 A1 | 10/2006 | Ahmed | |
| 2006/0253582 A1 | 11/2006 | Dixon et al. | |
| 2007/0019543 A1 | 1/2007 | Wei et al. | |
| 2009/0138342 A1 | 5/2009 | Otto et al. | |
| 2009/0281852 A1 | 11/2009 | Abhari et al. | |
| 2009/0292925 A1 | 11/2009 | Meisel | |
| 2010/0037314 A1 | 2/2010 | Perdisci et al. | |
| 2010/0076857 A1 | 3/2010 | Deo et al. | |
| 2010/0115621 A1 | 5/2010 | Staniford et al. | |
| 2010/0169343 A1 * | 7/2010 | Kenedy | G06F 16/285 707/758 |
| 2010/0191737 A1 | 7/2010 | Friedman et al. | |
| 2010/0205665 A1 | 8/2010 | Komili et al. | |
| 2010/0228636 A1 | 9/2010 | Silverman et al. | |
| 2010/0235918 A1 | 9/2010 | Mizrahi et al. | |
| 2011/0222787 A1 | 9/2011 | Thiemert et al. | |
| 2012/0030293 A1 | 2/2012 | Bobotek | |
| 2012/0079596 A1 | 3/2012 | Thomas et al. | |
| 2012/0087583 A1 | 4/2012 | Yang et al. | |
| 2012/0158626 A1 | 6/2012 | Zhu et al. | |
| 2012/0233656 A1 | 9/2012 | Rieschick et al. | |
| 2012/0291125 A1 | 11/2012 | Maria | |
| 2013/0086677 A1 | 4/2013 | Ma et al. | |
| 2013/0103666 A1 | 4/2013 | Sandberg et al. | |
| 2013/0111591 A1 | 5/2013 | Topan et al. | |
| 2013/0117848 A1 | 5/2013 | Golshan et al. | |
| 2013/0191364 A1 | 7/2013 | Kamel et al. | |
| 2013/0263264 A1 | 10/2013 | Klein et al. | |
| 2013/0297619 A1 | 11/2013 | Chandrasekaran et al. | |
| 2013/0340080 A1 | 12/2013 | Gostev et al. | |
| 2014/0033307 A1 | 1/2014 | Schmidtler | |
| 2014/0058854 A1 | 2/2014 | Ranganath et al. | |
| 2014/0082730 A1 | 3/2014 | Vashist et al. | |
| 2014/0173287 A1 | 6/2014 | Mizunuma | |
| 2014/0310811 A1 | 10/2014 | Hentunen | |
| 2015/0007250 A1 | 1/2015 | Dicato, Jr. et al. | |
| 2015/0049547 A1 | 2/2015 | Kim | |
| 2015/0067839 A1 | 3/2015 | Wardman et al. | |
| 2015/0163242 A1 * | 6/2015 | Laidlaw | G06N 7/023 726/22 |
| 2015/0170312 A1 | 6/2015 | Mehta et al. | |
| 2015/0200963 A1 | 7/2015 | Geng et al. | |
| 2015/0220735 A1 | 8/2015 | Paithane et al. | |
| 2015/0295945 A1 | 10/2015 | Canzanese et al. | |
| 2015/0363791 A1 | 12/2015 | Raz et al. | |
| 2015/0381654 A1 | 12/2015 | Wang et al. | |
| 2016/0036837 A1 | 2/2016 | Jain et al. | |
| 2016/0036838 A1 | 2/2016 | Jain et al. | |
| 2016/0044054 A1 | 2/2016 | Stiansen et al. | |
| 2016/0055490 A1 | 2/2016 | Keren et al. | |
| 2016/0065595 A1 | 3/2016 | Kim et al. | |
| 2016/0112445 A1 | 4/2016 | Abramowitz | |
| 2016/0149943 A1 | 5/2016 | Kaloroumakis et al. | |
| 2016/0191243 A1 | 6/2016 | Manning | |
| 2016/0205122 A1 | 7/2016 | Bassett | |
| 2016/0205123 A1 | 7/2016 | Almurayh et al. | |
| 2016/0253679 A1 | 9/2016 | Venkatraman et al. | |
| 2016/0261628 A1 | 9/2016 | Doron et al. | |
| 2016/0267179 A1 | 9/2016 | Mei et al. | |
| 2016/0285907 A1 | 9/2016 | Nguyen et al. | |
| 2016/0306974 A1 | 10/2016 | Turgeman et al. | |
| 2017/0034211 A1 | 2/2017 | Buergi et al. | |
| 2017/0134401 A1 | 5/2017 | Medvedovsky et al. | |
| 2017/0142144 A1 | 5/2017 | Weinberger et al. | |
| 2017/0149813 A1 | 5/2017 | Wright et al. | |
| 2017/0200457 A1 | 7/2017 | Chai et al. | |
| 2017/0230401 A1 | 8/2017 | Ahmed et al. | |
| 2017/0244735 A1 | 8/2017 | Visbal et al. | |
| 2017/0250972 A1 | 8/2017 | Ronda et al. | |
| 2017/0272471 A1 | 9/2017 | Veeramachaneni et al. | |
| 2017/0279818 A1 | 9/2017 | Milazzo et al. | |
| 2017/0286544 A1 | 10/2017 | Hunt et al. | |
| 2017/0289187 A1 | 10/2017 | Noel et al. | |
| 2017/0295157 A1 | 10/2017 | Chavez et al. | |
| 2017/0295187 A1 | 10/2017 | Havelka et al. | |
| 2017/0324738 A1 | 11/2017 | Hari et al. | |
| 2017/0344655 A1 * | 11/2017 | Raymond | G06F 16/9566 |
| 2017/0346839 A1 | 11/2017 | Peppe et al. | |
| 2018/0012021 A1 | 1/2018 | Volkov | |
| 2018/0012144 A1 | 1/2018 | Ding et al. | |
| 2018/0034779 A1 * | 2/2018 | Ahuja | G06F 16/24568 |
| 2018/0063190 A1 | 3/2018 | Wright et al. | |
| 2018/0096153 A1 | 4/2018 | Dewitte et al. | |
| 2018/0115573 A1 | 4/2018 | Kuo et al. | |
| 2018/0268464 A1 | 9/2018 | Li | |
| 2018/0307832 A1 | 10/2018 | Ijiro et al. | |
| 2018/0309787 A1 | 10/2018 | Evron et al. | |
| 2019/0089737 A1 | 3/2019 | Shayevitz et al. | |
| 2019/0207973 A1 | 7/2019 | Peng | |
| 2020/0042893 A1 * | 2/2020 | Hunt | G16H 10/00 |
| 2020/0134702 A1 | 4/2020 | Li | |
| 2021/0258791 A1 * | 8/2021 | Jochem | H04W 12/66 |

FOREIGN PATENT DOCUMENTS

| | | | |
|---|---|---|---|
| CN | 108737423 A | | 11/2018 |
| CN | 110532784 A * | | 12/2019 ......... G06F 16/9566 |
| CN | 111163053 A * | | 5/2020 |
| EP | 1160646 A2 | | 12/2001 |
| EP | 2410452 B1 | | 1/2016 |
| GB | 2493514 A | | 2/2013 |

(56) References Cited

FOREIGN PATENT DOCUMENTS

| | | |
|---|---|---|
| RU | 2382400 C2 | 2/2010 |
| RU | 2446459 C1 | 3/2012 |
| RU | 2487406 C1 | 7/2013 |
| RU | 2488880 C1 | 7/2013 |
| RU | 2495486 C1 | 10/2013 |
| RU | 2523114 C2 | 7/2014 |
| RU | 2530210 C2 | 10/2014 |
| RU | 2536664 C2 | 12/2014 |
| RU | 2538292 C1 | 1/2015 |
| RU | 2543564 C1 | 3/2015 |
| RU | 2566329 C2 | 10/2015 |
| RU | 2571594 C2 | 12/2015 |
| RU | 2589310 C2 | 7/2016 |
| RU | 2607231 C2 | 1/2017 |
| RU | 2610586 C2 | 2/2017 |
| RU | 2613535 C1 | 3/2017 |
| RU | 2622870 C2 | 6/2017 |
| RU | 2625050 C1 | 7/2017 |
| RU | 2628192 C2 | 8/2017 |
| RU | 2636702 C1 | 11/2017 |
| RU | 2670906 C9 | 12/2018 |
| RU | 2676247 C1 | 12/2018 |
| RU | 2681699 C1 | 3/2019 |
| RU | 2697925 C1 | 8/2019 |
| RU | 2701040 C1 | 9/2019 |
| WO | 0245380 A2 | 6/2002 |
| WO | 2009/026564 A1 | 2/2009 |
| WO | 2011/045424 A1 | 4/2011 |
| WO | 2012/015171 A2 | 2/2012 |
| WO | 2019/010182 A1 | 1/2019 |

OTHER PUBLICATIONS

European Search Report with regard to EP17180099 completed on Nov. 28, 2017.
European Search Report with regard to EP17191900 completed on Jan. 11, 2018.
Yoshioka et al., "Sandbox Analysis with Controlled Internet Connection for Observing Temporal Changes of Malware Behavior", https://www.researchgate.net/publication/254198606, 15 pages.
Yoshioka et al., "Multi-Pass Malware Sandbox Analysis with Controlled Internet Connection", IEICE Transactions on Fundamentals of Electronics, Communications and Computer Sciences, Engineering Sciences Society, Tokyo, 2010, vol. E93A, No. 1, pp. 210-218.
Wikipedia, "Blockchain", https://en.wikipedia.org/wiki/Blockchain, pdf document, 18 pages.
English Abstract of RU129279 retrieved on Espacenet on Sep. 11, 2017.
English Abstract of RU164629 retrieved on Espacenet on Sep. 11, 2017.
English Abstract of RU2538292 retrieved on Espacenet on Sep. 18, 2017.
Prakash et al., "PhishNet: Predictive Blacklisting to Detect Phishing Attacks", INFOCOM, 2010 Proceedings IEEE, USA, 2010, ISBN: 978-1-4244-5836-3, doc. 22 pages.
English Abstract of RU2522019 retrieved on Espacenet on Jan. 25, 2019.
European Search Report with regard to the counterpart EP Patent Application No. EP17211131 completed Apr. 12, 2018.
Search Report with regard to the counterpart RU Patent Application No. 2020127038 dated Sep. 29, 2020.
English Abstract for CN 108737423 retrieved on Espacenet on Nov. 4, 2020.
English Abstract for CN 103986731 retrieved on Espacenet on Nov. 4, 2020.
English Translation of CN106713312, © Questel—FAMPAT, Jul. 17, 2019.
English Translation of CN105897714, © Questel—FAMPAT, Jul. 17, 2019.
English Translation of CN106506435, © Questel—FAMPAT, Jul. 26, 2019.
English Translation of CN107392456, © Questel—FAMPAT, Jul. 29, 2019.
English Translation of CN103491205, © Questel—FAMPAT, Jul. 29, 2019.
English Translation of CN106131016, © Questel—FAMPAT, Jul. 17, 2019.
Invitation to Respond to Written Opinion with regard to the counterpart SG Patent Application No. 10201900339Q.
Invitation to Respond to Written Opinion with regard to the counterpart SG Patent Application No. 10201901079U.
Invitation to Respond to Written Opinion with regard to the counterpart SG Patent Application No. 10201900335P.
English Translation of KR10-2007-0049514 (Description, Claims) retrieved on Espacenet on Oct. 16, 2019.
English Abstract of KR10-1514984 retrieved on Espacenet on Oct. 15, 2019.
Office Action with regard to the counterpart U.S. Appl. No. 15/707,641 dated Apr. 25, 2019.
European Search Report with regard to the counterpart EP Patent Application No. EP17210904 completed May 16, 2018.
Office Action with regard to the counterpart U.S. Appl. No. 16/261,854 dated Oct. 21, 2019.
Notice of Allowance with regard to the counterpart U.S. Appl. No. 15/707,641 dated Oct. 30, 2019.
Whyte, "DNS-based Detection of Scanning Worms in an Enterprise Network", Aug. 2004, NOSS, pp. 1-17 (Year 2005)—in the Notice of Allowance with regard to the counterpart U.S. Appl. No. 15/707,641.
Office Action with regard to the counterpart U.S. Appl. No. 15/858,013 dated Nov. 22, 2019.
Search Report with regard to the counterpart SG Patent Application No. 10201900062S dated Dec. 5, 2019.
Search Report with regard to the counterpart SG Patent Application No. 10201900060Y dated Dec. 5, 2019.
English Abstract for CN 105429956 retrieved on Espacenet on Jan. 7, 2020.
English Abstract for CN 104504307 retrieved on Espacenet on Jan. 7, 2020.
Office Action received with regard to the counterpart U.S. Appl. No. 15/858,032 dated Apr. 6, 2020.
Notice of Allowance with regard to the counterpart U.S. Appl. No. 15/858,013 dated May 8, 2020.
Office Action with regard to the counterpart U.S. Appl. No. 16/270,341 dated May 27, 2020.

* cited by examiner

METHOD AND SYSTEM FOR IDENTIFYING CLUSTERS OF AFFILIATED WEB RESOURCES

FIELD OF THE INVENTION

The present application claims priority to Singaporean Patent Application No. 10202006752V, entitled "METHOD AND SYSTEM FOR IDENTIFYING CLUSTERS OF AFFILIATED WEB RESOURCES" filed on Jul. 15, 2020, the entirety of which is incorporated herein by reference.

FIELD OF THE INVENTION

The present technology generally relates to the field of information security; and more specifically, to methods and systems for identifying clusters of affiliated web resources.

BACKGROUND

Fraud is the most common and easiest way of committing cybercrimes. For example, according to the statistics provided by Group-IB, losses from a single phishing attack may amount to around S20,000. In addition to substantial financial loss, damage to reputation should be considered.

There are two types of phishing targets: individual users and companies. Typically, in the former scenario, online fraudsters tend to operate alone because performing such an attack can be uncomplicated and may not require any specific expertise. This type of attacks becomes even more common due to the "phishing kits" available for purchase in the darknet (that is, illegally).

The attacks of the latter type, that is, those targeting companies and brands, may be performed in a different way. Typically, for a successful phishing attack against a targeted web resource, such as that of a bank, for example, the online fraudsters may have specific knowledge of programming and social engineering to scout for the initial target. As a result, the online fraudsters may organize in groups and associations.

According to the estimates of Group-IB, in Russia alone, there are approximately 15 online fraudster associations specializing in phishing, and this number is growing. Each of these associations can simultaneously own several hundred phishing pages targeted at different valid web resource—such as those representing companies or brands associated therewith.

Generally, a given phishing page targeting a given valid web resource may be created using a common pattern. To that end, the given phishing web resource may exist only for a predetermined period and may further be replaced by a new phishing web resource corresponding to the same common pattern and still targeting the given valid web resource, but with a different hosting provider or associated with a different email, for example. As soon as each new phishing page appears, urgent action is required to prevent the financial losses of the given valid web resource.

Certain prior art approaches have been proposed to address the above-identified technical problem.

Russian Patent No.: 2681699-C1 issued on Mar. 12, 2019, assigned to Trust LLC, and entitled "Method and Server for Searching Related Network Resources" discloses a method including scanning the network in order to search for network resources; in the network scanning stage, at least the first network resource and at least the second network resource are found; retrieving information about the found at least the first network resource and at least the second network resource including at least one parameter of the first network resource and at least one parameter of the second network resource; in response to the fact that at least one parameter of the first network resource coincides with at least one parameter of the second network resource, building a connection between the first network resource and the second network resource.

PCT Application Publication No.: 2019/010182-A1 published on Jan. 10, 2019, assigned to CLEVELAND et al., and entitled "Method and System for Detecting Phishing" discloses a method of detecting a phishing event comprises acquiring an image of visual content rendered in association with a source, and determining that the visual content includes a password prompt. The method comprises performing an object detection, using an object detection convolutional network, on a brand logo in the visual content, to detect one or more targeted brands. Spatial analysis of the visual content may be performed to identify one or more solicitations of personally identifiable information. The method further comprises determining, based on the object detection and the spatial analysis, that at least a portion of the visual content resembles content of a candidate brand, and comparing the domain of the source with one or more authorized domains of the candidate brand. A phishing event is declared when the comparing indicates that the domain of the source is not one of the authorized domains of the candidate brand.

United States Application Publication No.: 2016/0055490-A1 published on Feb. 25, 2016, assigned to BRANDSHIELD LTD, and entitled "Device, System, and Method Of Protecting Brand Names and Domain Names" discloses a A computerized method of protecting a brand name of a brand owner, includes: (a) crawling a global communication network to identify and collect data about web-sites that possibly abuse the brand name; (b) for each web-site that possibly abuses the brand name, analyzing whether or not the web-site abuses the brand name by analyzing at least one of: (i) content of the web-site; and (ii) data about an owner of the web-site. The method further includes: for each web-site that possibly abuses the brand name, (A) generating an investment score indicating an estimated level of investment that was invested in development of the web-site; and (B) generating a damage score indicating a level of damage that the web-site is estimated to produce to the brand name.

SUMMARY

It is an object of the present technology to ameliorate at least some of the inconveniences present in the prior art.

Developers of the present technology have realized that the prior art approaches may be somewhat cumbersome as they may have to consider too many web resources for generating clusters thereof, which eventually may affect efficiency and effectiveness of these approaches. In addition, the aforementioned prior art approaches appear to be directed to generating the clusters of web resources based on separate specific parameters, such as a DNS address associated with the given phishing web resource, which may not allow effectively responding to phishing attacks generated by web resources affiliated to the given phishing web resource.

Therefore, the developers have appreciated that the clusters of the web resources may be generated based on specific attributes associated therewith. In this regard, each cluster of web resources may include, for example, those web resources that have been created by a same owner/group, have same structural elements placed on similar positions within the associated web pages, associated with similar regional settings, and the like. By so doing, the clusters of web resources may be used to detect new web resources affiliated with one of the web resources therefrom more effectively and in a timely manner. This, in turn, may allow developing a more efficient strategy for identifying and preventing phishing attacks.

Thus, according to a first broad aspect of the present technology, there is provided a method of determining an affiliation of a web resource to a plurality of clusters of web resources. The method is executable by a computing device having at least a processing unit and a memory. The memory stores computer executable instructions, which, when executed, cause the processing unit to execute: at a training stage: scanning a communication network to detect a plurality of web resources; retrieving information associated with the plurality of web resources; based on the information, for each one of the plurality of web resources, generating a respective pattern; based on the respective pattern, grouping the plurality of web resources into the plurality of clusters, the grouping being based on a pattern affiliation between the respective patterns; storing an indication of the plurality of clusters of web resources in the memory; at a run-time stage: receiving an indication of an URL to a given web resource; retrieving the information about the given web resource; generating a new pattern of the given web resource; analyzing the pattern affiliation of the new pattern with the patterns associated with the plurality of clusters of the web resources; calculating an affiliation ratio with at a specific one of the plurality of clusters; in response to the affiliation ratio with the specific one of the plurality of clusters exceeding a predetermined threshold value, associating the given web resource with the specific one of the plurality of clusters; updating the plurality of clusters stored in the database based on the given web resource.

In some implementations of the method, the respective pattern comprises a matrix of distinctive attributes associated with a respective one of the plurality of web resources identified via analyzing the information associated with the plurality of web resources.

In some implementations of the method, the distinctive attributes associated with the respective one of the plurality of web resources comprise at least one of: a size of at least one page block within at least one page associated with the respective one of the plurality of web resources; a position of the at least one page block within the at least one page; a title associated with the at least one page block; region parameters associated with the at least one page; at least one target domain associated with the at least one page, including at least one of: links placed within the at least one page and transition types associated therewith, the transition types further including at least one of: a direct transition type and a redirect transition type; contact details; path patterns to respective structural elements of the at least one page and styles associated therewith; and names of the structural elements.

In some implementations of the method, the information associated with the plurality of web resources includes, for a given web resource, at least one of: an URL of the given web resource; an HTML code associated with the given web resource; a screenshot of at least one web page associated with the given web resource page and a hash value thereof; a date of detecting the given web resource; and domain registration data associated with the given web resource, including: a registration date, a registrar, an owner name and contact details; an IP address; an NS server; a hosting provider; a last activity date.

In some implementations of the method, the matrix of distinctive attributes contains at least one distinctive attribute associated with the respective one of the plurality of web resources.

In some implementations of the method, each of the distinctive attributes has been selected based on a pre-determined parameter R, the pre-determined parameter being indicative of a maximum threshold value for a degree of distinctiveness of a given distinctive attribute for selection thereof for the respective pattern.

In some implementations of the method, the degree of distinctiveness of the given distinctive attribute is determined based on the following inequality:

$$p_i < R,$$

where p is a number of web resource within the plurality of web resources associated with the given distinctive attribute.

In some implementations of the method, the calculating the affiliation ratio further comprises calculating a number of distinctive attributes associated with the given web resource that are similar to those associated with the specific one of the plurality of clusters.

In some implementations of the method the analyzing the pattern affiliation of the new pattern with the patterns associated with the plurality clusters further comprises applying a cross-correlation technique.

According to a second broad aspect of the present technology, there is provided a system for determining an affiliation of a web resource to a plurality of clusters of web resources. The system comprises a computing device, the computing device further comprising: a processor; a non-transitory computer-readable medium comprising instructions. The processor, upon executing the instructions, is configured to: at a training stage: scan a communication network to detect a plurality of web resources; retrieve information associated with the plurality of web resources; based on the information, for each one of the plurality of web resources, generate a respective pattern; based on the respective pattern, group the plurality of web resources into the plurality of clusters, the grouping being based on a pattern affiliation between the respective patterns; store an indication of the plurality of clusters of web resources in the memory; at a run-time stage: receive an indication of an URL to a given web resource; retrieve the information about the given web resource; generate a new pattern of the given web resource; analyze the pattern affiliation of the new pattern with the patterns associated with the plurality of clusters of web resources; calculate an affiliation ratio with at a specific one of the plurality of clusters; in response to the affiliation ratio with the specific one of the plurality of clusters exceeding a predetermined threshold value, associate the given web resource with the specific one of the plurality of clusters; update the plurality of clusters stored in the database based on the given web resource.

BRIEF DESCRIPTION OF THE DRAWINGS

Non-limiting embodiments of the present technology are described herein with reference to the accompanying drawings; these drawings are only presented to explain the essence of the invention and are not limiting the scope of the present technology in any way, where.

DETAILED DESCRIPTION

The following detailed description is provided to enable any one skilled in the art to implement and use the non-limiting embodiments of the present technology. Specific details are provided merely for descriptive purposes and to give insights into the present technology, and no was as a limitation. However, it would be apparent for the person skilled in the art that some of these specific details may not be necessary to implement certain non-limiting embodiments of the present technology. The descriptions of specific implementations are only provided as representative examples. Various modifications of these embodiments may become apparent to the person skilled in the art; the general principles defined in this document may be applied to other non-limiting embodiments and implementations without departing from the scope of the present technology.

Certain non-limiting embodiments of the present technology are directed to systems and methods to identifying a plurality of cluster of web resources and determining affiliation of other web resources thereto.

Figure 1:
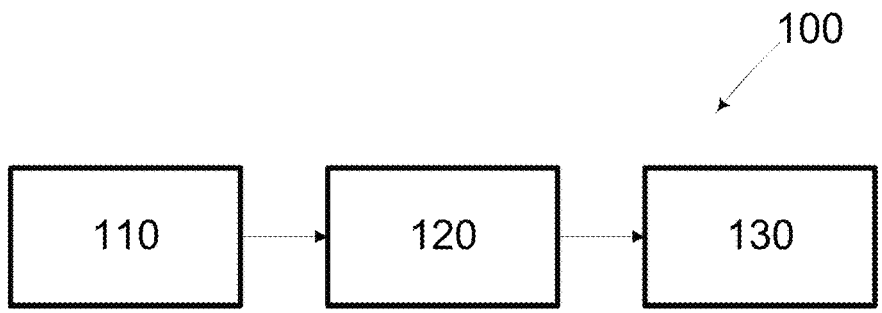
FIG. 1 depicts a schematic diagram of an example system suitable for implementation certain non-limiting embodiments of the present technology.

With reference to FIG. 1, there is depicted a schematic diagram of a system 100 used to determine the plurality clusters of web resources, according to certain non-limiting embodiments of the present technology According to some non-limiting embodiments of the present technology, the system 100 comprises a data acquisition module 110 that may be communicatively coupled to a network 120.

In some non-limiting embodiments of the present technology, the network 120 is the Internet and/or an Intranet. Multiple embodiments of the network 120 may be envisioned and will become apparent to the person skilled in the art of the present technology. Further, how a communication link between the system 100 and the network 120 is implemented will depend, inter alia, on how the system 100 is implemented, and may include, but is not limited to, a wire-based communication link and a wireless communication link (such as a Wi-Fi communication network link, a 3G/4G communication network link, and the like).

Thus, in some non-limiting embodiments of the present technology, the data acquisition module 110 can scan the network 120 to receive respective URL links to a plurality of web resources and store them in an internal database (not depicted) communicatively coupled to the data acquisition module 110.

In alternative non-limiting embodiments of the present technology, the data acquisition module 110 may be configured to communicate with an external data storage (not depicted) to receive the respective URL links to the plurality of web resources for further analysis.

Figure 6:
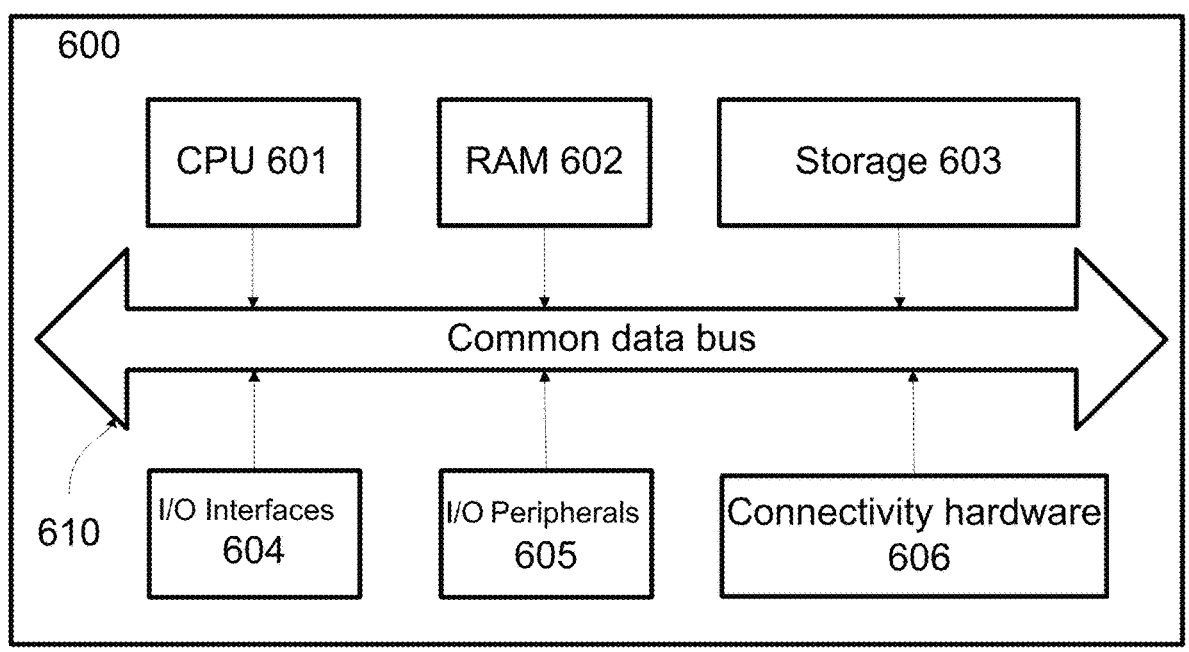
FIG. 6 shows a schematic diagram of an example computing environment of the system of FIG. 1 configurable for execution of methods of FIGS. 2 and 5, in accordance with certain non-limiting embodiments of the present technology.

Further, having received the URL link to the given web resource, the data acquisition module may be configured to transmit it to a computing device (such as a computing device 600 depicted of FIG. 6, not depicted in FIG. 1). According to some non-limiting embodiments of the present technology, the computing device 600 can be configured to implement a method for classifying and filtering the content received via the network 120. The so processed data, by the computing device 600, may further be transmitted back to the system 100. To that end, in some non-limiting embodiments of the present technology, the system 100 may further comprise an output module 130 communicatively coupled to the computing device 600.

In these embodiments, the output module 130 can be configured to output the analysis report associated with the URL link. This report may include data indicative of an affiliation score associated the given web resource which is located under the URL link received by the data acquisition module 110. How the affiliation score for the given web resource is calculated will be described immediately below.

Figure 2:
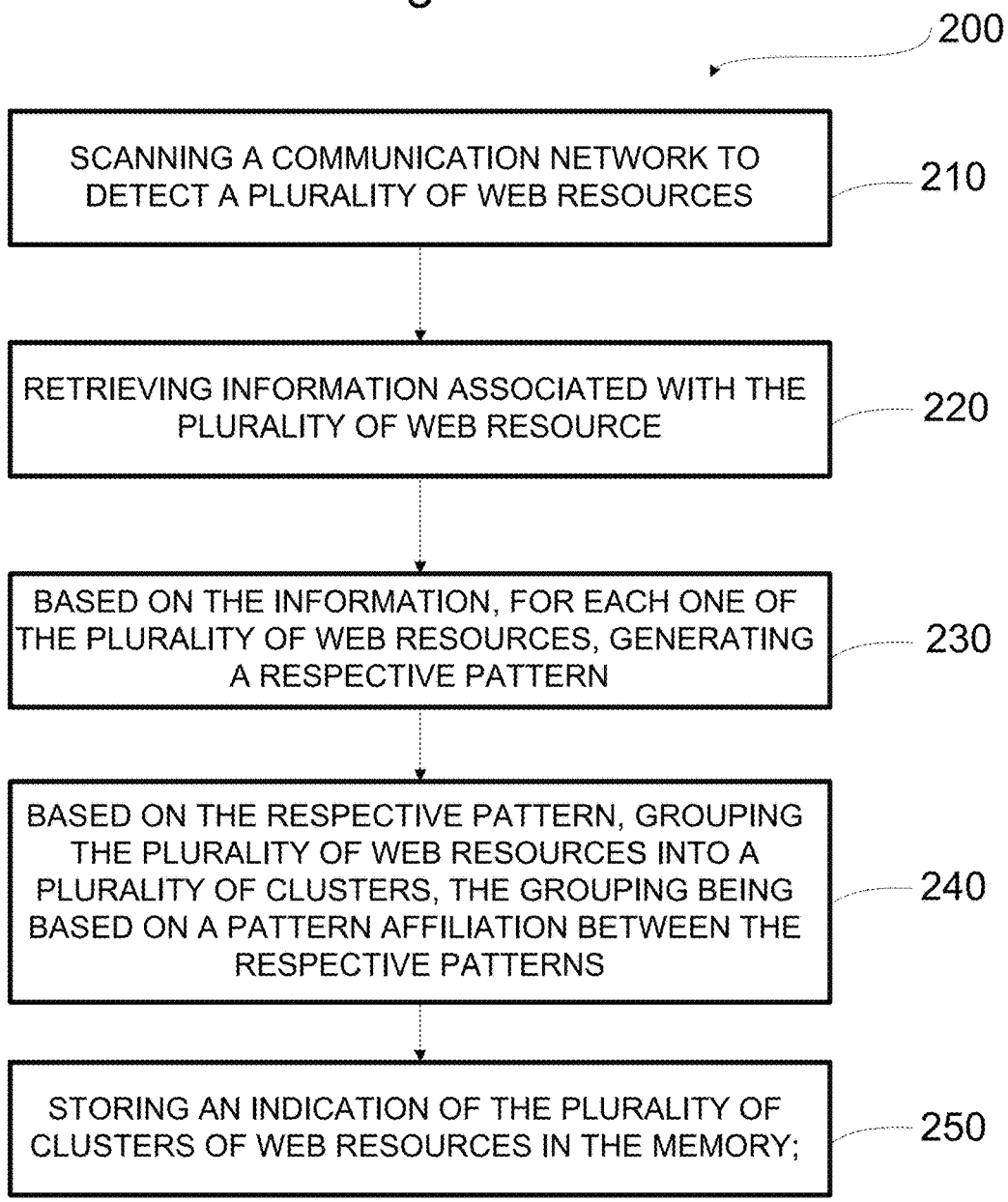
FIG. 2 depicts a flowchart diagram of a method for generating clusters of web resources, in accordance with certain non-limiting embodiments of the present technology.

With reference to FIG. 2, there is provided a flowchart diagram of a method 200 for generating clusters of web resources, according to certain non-limiting embodiments of the present technology. The method 200 may be executed by the computing device 600.

Step 210: Scanning a Communication Network to Detect a Plurality of Web Resources The method 200 commences at step 210, where the computing device 600 is configured to scan the network 120 to identify the plurality web resources for further analysis. How the computing device 600 is configured to scan the network 120 is not limited, and in certain non-limiting embodiments of the present technology, may be performed using any known specific software for scanning and crawling communication networks.

In alternative non-limiting embodiments of the present technology, the web resources may be received, by the computing device 600, from a database of web resources, which may be, for example, internally hosted at the computing device 600 or communicatively coupled thereto via the network 120.

The method 200 hence advances to step 220.

Step 220: Retrieving Information Associated with the Plurality of Web Resources;

At step 220, according to the certain non-limiting embodiments of the present technology, once the URL link to the given web resource has been received, the information associated therewith may thus be retrieved.

In some non-limiting embodiments of the present technology, the computing device 600 may be configured to retrieve the information associated with the given web resource including at least one of:
  a URL of the given web resource;
  an HTML code of at least one page associated with the given web resource;

a screenshot of the at least one page associated with the given web resource and a hash value thereof;
a date of detecting the given web resource; and domain registration data associated with the given web resource, further including:
a registration date, a registrar,
an owner name and contact details;
an IP address;
an NS server;
a hosting provider;
a last activity date.

Further, in some non-limiting embodiments of the present technology, the computing device 600 may be configured to store the information associated with the given web resource in the database of the web resources.

According to some non-limiting embodiments of the present technology, the computing device 600 may further be configured to analyze the HTML code of at least one page associated with the given web resource to identify distinctive attributes associated with the given web resource.

In some non-limiting embodiments of the present technology, the computing device 600 may be configured to conduct such an analysis of the HTML code associated with given the web resource pages automatically, e.g., using a specialized software which can detect the distinctive attributes associated with the given web resource.

In additional non-limiting embodiments of the present technology, the analyzing, by the computing device 600, the HTML code associated with the given web resource may be performed to identify distinctive attributes of pages associated with the given web resource, which may further be used to analyze similarity of patterns thereof.

According to certain non-limiting embodiments of the present technology, the distinctive attributes identified via the analyzing the HTML code associated with the given web resource page may include at least one of:
a size of at least one page block within at least one page associated with the respective one of the plurality of web resources;
a position of the at least one page block within the at least one page;
a title associated with the at least one page block;
regional parameters associated with the at least one page;
at least one target domain associated with the at least one page, including at least one of: links placed within the at least one page and transition types associated therewith, the transition types further including at least one of: a direct transition type and a redirect transition type;
contact details—for example, contact details associated with a registrar of the at least one page associated with the given web resources, or those placed therewithin;
path patterns to respective structural elements of the at least one page and styles associated therewith; and
a name of each of the respective structural elements.

In some non-limiting embodiments of the present technology, each of the aforementioned distinctive attributes may be represented by a respective sequence of bytes in the HTML code of the at least page, or may contain a sequence of bytes indicative of one of a brand and a phishing target of the given web resource.

In some non-limiting embodiments of the present technology, the computing device 600 may be configured to store, in the database of web resources, a hash value of the at least one page associated with the given web resource. It should be expressly understood that, according to the non-limiting embodiments of the present technology, the hash value may be obtained using any suitable hashing algorithm, such as a universal hash function, a non-cryptographic hash function, a keyed cryptographic hash function, and the like.

In the context of the present specification, a screenshot of a given web page denotes a graphic representation (such as a picture) of a content of the given web page. Such a graphic representation may be stored as a file in the database of the web resources associated with the computing device 600. Further, data indicative of the screenshot, along with an associated hash values, may be used to estimate an affiliation score associated therewith. The screenshots may be compared both bitwise and based on hash values of associated pages.

In some non-limiting embodiments of the present technology, the computing device 600 may further be configured to determine the domain registration data including at least the one of: a registration date, a registrar, an owner's name and contact details, as an example.

It should be noted that how the domain registration data may be acquired is not limited; and, in specific non-limiting embodiments of the present technology, to determine the domain registration data, the computing device 600 may be configured to have access, via the network 120, to a WHOIS domain lookup service. Typically, the WHOIS domain lookup service may be configured to provide, in response to a respective WHOIS query, detailed information about the domain of the given web resource, including, but not being limited to: a registration date and time, an expiry date and time, a current DNS sever of the domain, its statuses, and also information about the registrar that owns the domain name. If the domain name does not exist, the response to the respective WHOIS query may indicate that the domain name has not been found. In certain scenarios, if the domain zone does not provide the information about the owner of the domain name in the response to the respective WHOIS query, the WHOIS domain lookup service may be configured to request this information from the domain registrar.

The method 200 hence advances to step 230.

Step 230: Based on the Information, for Each One of the Plurality of Web Resources, Generating a Respective Pattern;

At step 230, having retrieved the necessary information associated with the given web resource, the computing device 600 may further be configured to generate a respective pattern for the given web resource.

In some non-limiting embodiments of the present technology, the respective pattern for the given web resources may comprise a matrix of the distinctive attributes associated with the given web resource.

Figure 3:
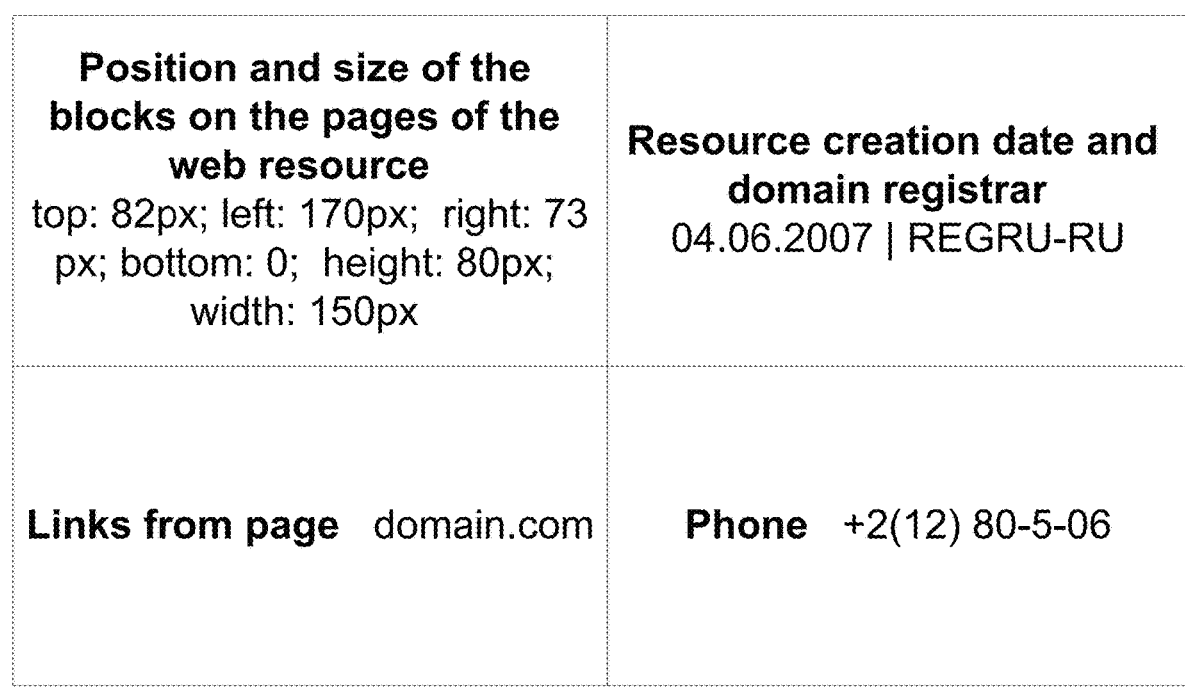
FIG. 3 depicts a schematic diagram of an example pattern associated with a given web resource and generated in accordance with the method of FIG. 2, in accordance with certain non-limiting embodiments of the present technology.

With reference to FIG. 3, there is depicted a schematic diagram of the a pattern 302 generated, by the computing device 600, for the given web resource, in accordance with certain non-limiting embodiments of the present technology.

As it can be appreciated, the pattern 302 has been generated, by the computing device 600, based on the information acquired during the analysis of the given web resource, thereby identifying the distinctive attributes associated therewith.

As mentioned earlier, in some non-limiting embodiments of the present technology, the information associated with the given web resource may include a position and size of at least one page block within at least page associated with the given web resource.

Below is an example excerpt of the HTML code of the at least one page associated with the given web resource representative of a position of "block_1" placed therewithin:

```
#block_1 {
  top: 82px; /* Distance from the top edge */
  left: 170px; /* Distance from the left edge */
  right: 73px; /* Distance from the right edge */
  bottom: 0/* Distance from the bottom */
  height: 80px; /* Height*/
  width: 150px; /*Width*/
}
```

According to this example, the block_1 is positioned, on the at least one page of the given web resource, at 82 pixels below the top edge, at 170 pixels from the left edge, at 73 pixels from the right edge and at 0 pixels from the bottom; and it is 150 pixels wide and 80 pixels high.

Further, in some non-limiting embodiments of the present technology, the information associated with the given web resource may include the registration date and the domain registrar associated the domain associated with the given web resource.

For example, in response to the respective WHOIS query, as described above in respect of execution of step 220, the WHOIS domain lookup service may be configured to provide the domain registration data as presented in Table 1 below. As it can be appreciated from Table 1, GROUP-IB.RU domain was registered on Jun. 14, 2007 and its registrar is REGRU-RU

TABLE 1

| Domain | GROUP-IB.RU |
|---|---|
| DNS Server | dora.ns.cloudflare.com. |
| DNS Server | tom.ns.cloudflare.com. |
| Registrar | REGRU-RU |
| Registration Date | 2007-06-14T20:00:00Z |
| Registration Expiry Date | 2020-06-14T21:00:00Z |

As previously mentioned, in other non-limiting embodiments of the present technology, the computing device 600 may further be configured to retrieve links placed within the at least one page and transition types associated therewith, the transition types further including at least one of: a direct transition type and a redirect transition type; and contact details associated with the at least one web page.

Broadly speaking, in some non-limiting embodiment of the present technology, the respective pattern may be generated based on any combination of distinctive attributes identified at step 220. Therefore, in some non-limiting embodiments of the present technology, the pattern 302 associated with the given web resource may include at least one distinctive attribute to be used for further analysis.

Figure 4A:
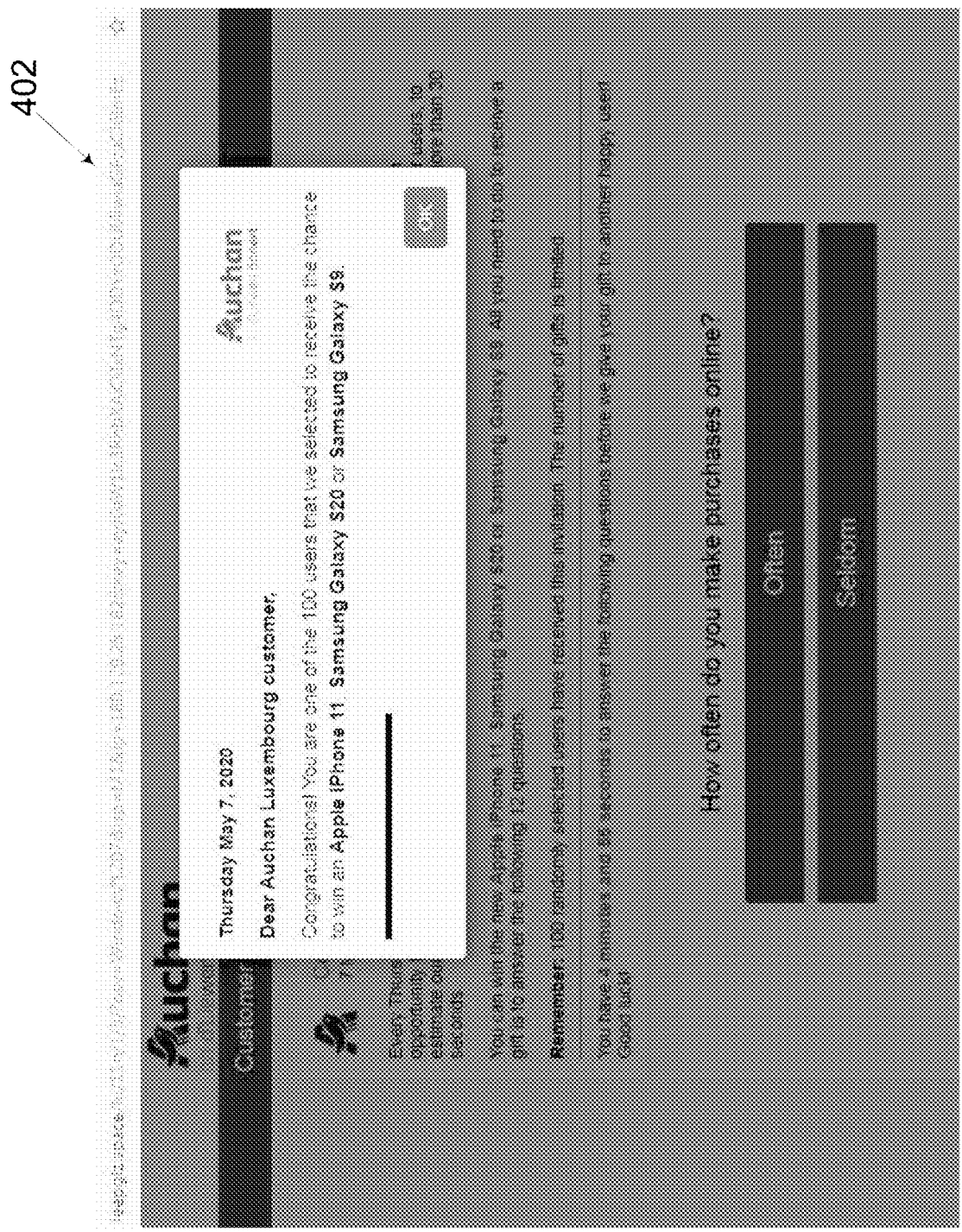
FIGS. 4A to 4B depict example web pages having been selected for pattern affiliation analysis in accordance with the method of FIG. 2, in accordance with certain non-limiting embodiments of the present technology.
Figure 4B:
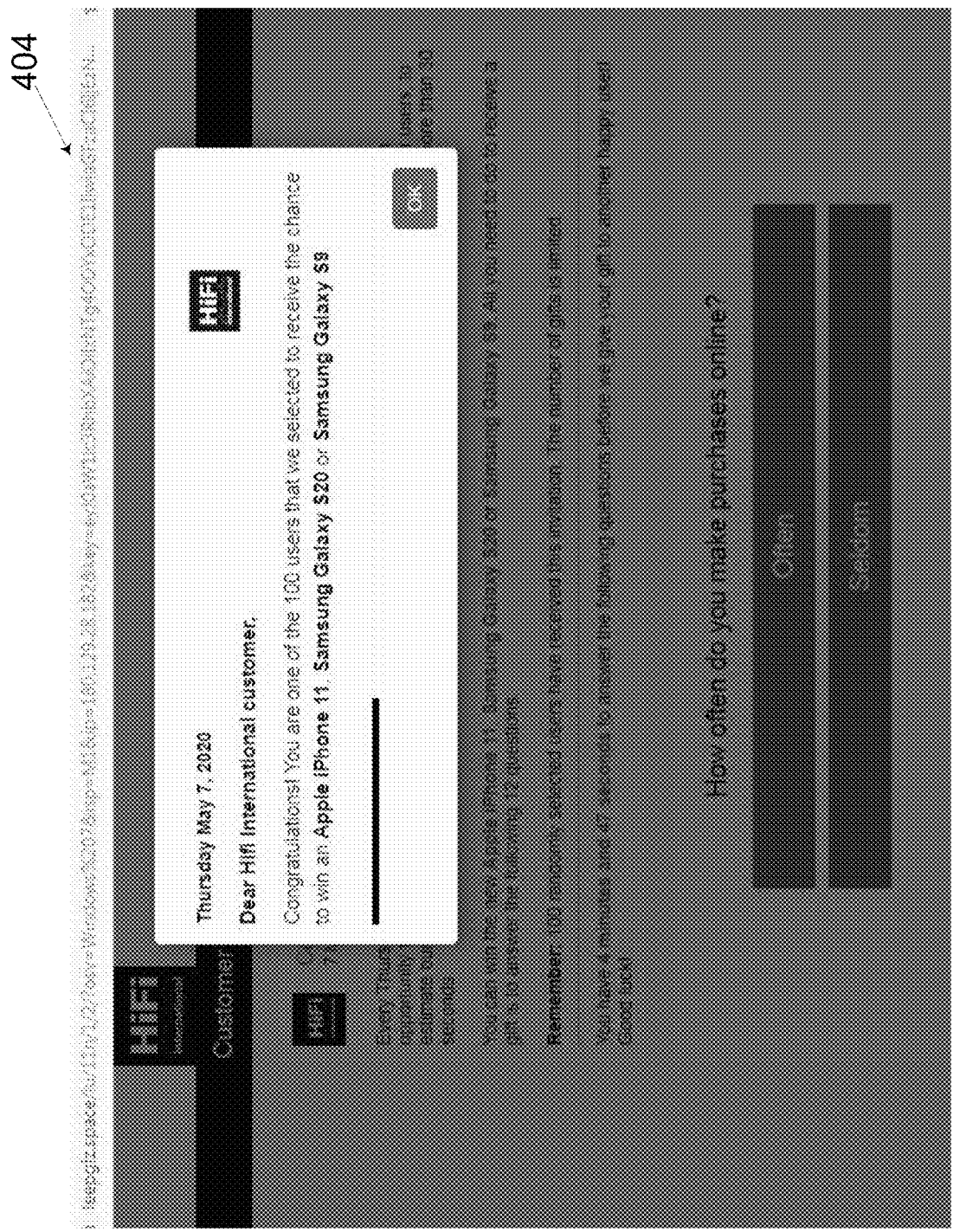

With reference to FIGS. 4A to 4B, there is schematically depicted pattern affiliation between two affiliated web resources respectively represented by a first page 402 (depicted in FIG. 4A) and a second page 404 (depicted in FIG. 4B), in accordance with certain non-limiting embodiments of the present technology.

Figure 4C:
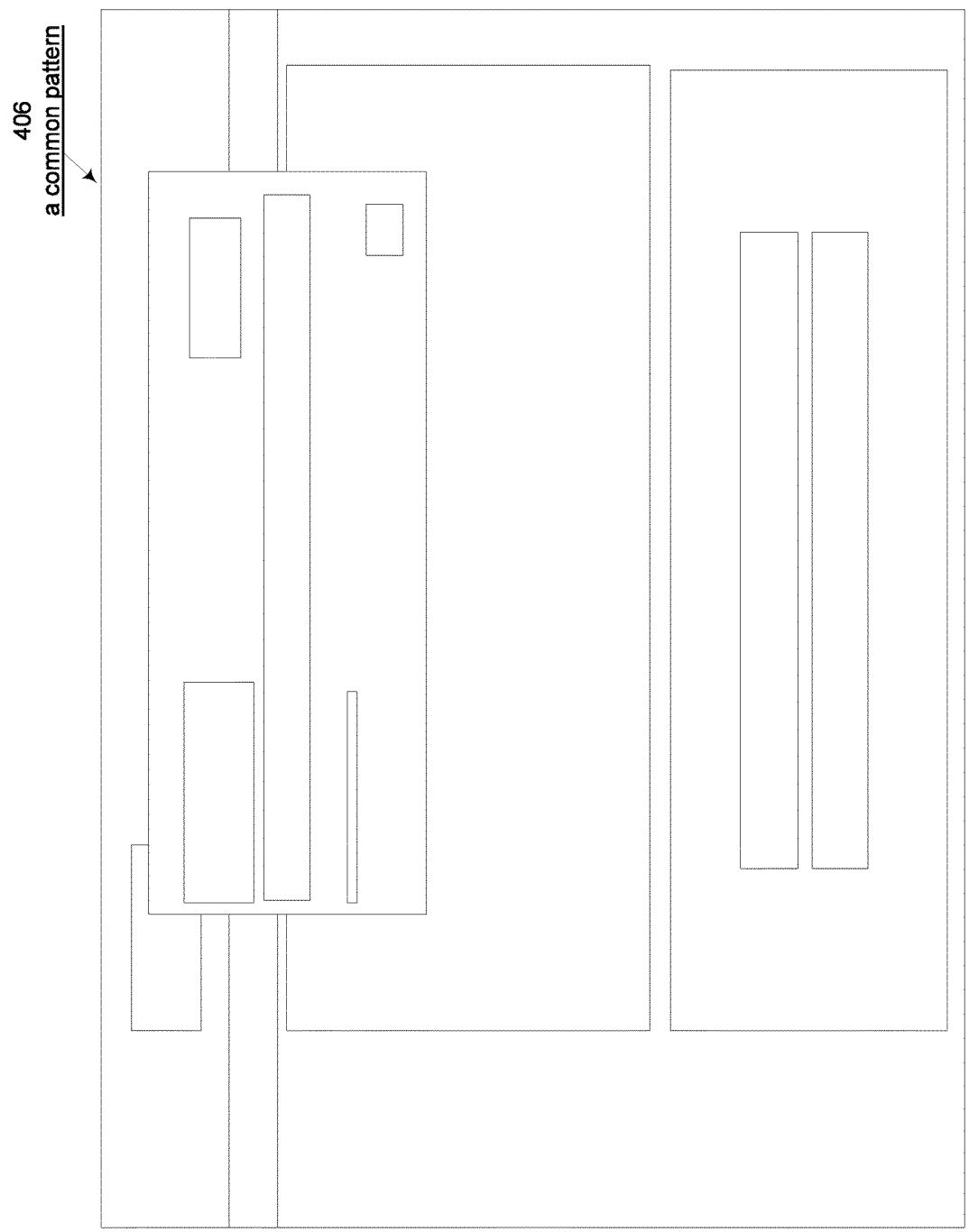
FIG. 4C depicts an example common pattern having been generated for the web pages of FIGS. 4A and 4B in accordance with the method of FIG. 2.

Further, with reference to FIG. 4C, there is depicted a common pattern 406 having been generated, by the computing device 600, for the first page 402 and the second page 404 depicted in FIGS. 4A and 4B, respectively, based on pattern affiliation analysis thereof, in accordance with certain non-limiting embodiments of the present technology.

In accordance with certain non-limiting embodiments of the present technology, each of the first page 402 and the second page 404 can have similar respective patterns (not separately labelled), however different within a certain confidence interval. In this regard, based on the pattern affiliation analysis described herein below in respect of step 240 of the method 200, the computing device 600 may be configured to generate the common pattern 406 for both the first page 402 and the second page 404, thereby determining affiliation therebetween. In some non-limiting embodiments of the present technology, the common pattern 406 may further be modified and updated, if necessary, such as upon identification new distinctive attributes associated with the first page and the second page, as an example, as will be described below.

Thus, the method 200 further proceeds to step 240.

Step 240: Based on the Respective Pattern, Grouping the Plurality of Web Resources into the Plurality of Clusters, the Grouping being Based on a Pattern Affiliation Between the Respective Patterns;

At step 240, the plurality of web resources, received at step 220 of the method 200, are further grouped (or otherwise clustered) based on a predetermined parameter indicative of affiliation of their respective patterns, thereby generating a plurality of clusters of the web resources.

To that end, the computing device 600 may be configured to determine, for the given web resources, a set of distinctive attributes to be included in the respective pattern. According to certain non-limiting embodiments of the present technology, the computing device 600 may be configured to determine the set of distinctive attributes based on their associated degrees of distinctiveness for the given resource.

In some non-limiting embodiments of the present technology, to determine a degree of distinctiveness, for each of the distinctive attributes associated with the given web resource, a predetermined parameter R may be used. In these embodiments, the predetermined parameter R may be determined by way of experiment using test samples to identify distinctive attributes for predetermined clusters of web resources as precisely as possible. In some non-limiting embodiments of the present technology, the predetermined parameter R may have been determined by a machine-learning algorithm trained based on the test samples.

According to some non-limiting embodiments of the present technology, the predetermined parameter R may be selected to exceed an estimated maximum size of a given group of web resources. For example, a value of the predetermined parameter R may be calculated according to the following formula:

$$R = 0.7 \cdot V, \qquad (1)$$

where V is a volume of the database of web resources associated with the computing device 600.

It should further be noted that other coefficients, such as 0.3, 0.5, 0.8, or 1.2, for example, may also be used for determining the value of the predetermined parameter R depending on a particular implementation of the present technology.

Further, for each distinctive attribute, the computing device 600 may be configured to determine a respective value of p corresponding to a number of web resources in the database of web resources associated with this distinctive attribute.

Additionally, the respective value of p may be selected in such a way that it does not exceed the value of the predetermined parameter R, which corresponds to the estimated maximum size of the given group of web resources, that is, the respective value of p may satisfy the following inequality:

$$p_i < R. \qquad (2)$$

Also, those distinctive attributes associated with respective values of p that are less than the value of R may be considered (sufficiently) distinctive for the given resource and thus will be selected in the set of distinctive attributes for generating the respective pattern.

By doing so, in some non-limiting embodiments of the present technology, the respective pattern may comprise a matrix of distinctive attributes associated with the given web resource. By doing so, the computing device 600 may be configured to generate a respective matrix for each one of the plurality of web resources identified at step 220 of the method 200 as described above.

Further, in some non-limiting embodiments of the present technology, the computing device 600 may be configured to analyze the respective matrices associated with the plurality of web resources amongst each other. To that end, in some non-limiting embodiments of the present technology, the analyzing may comprise comparing the respective matrices amongst each other by applying a cross-correlation technique.

In the context of the present specification, the term "cross-correlation technique" relates to the field of probability and statistics and refers to a method of determining similarities between entries of two sets of data, such as the distinctive attributes of the respective matrices associated with two given web resources—for example, by constructing a cross-correlation function describing similarities between the two sets of data.

Thus, according to certain non-limiting embodiments of the present technology, the computing device 600 may be configured to determine a proportion of matched distinctive attributes between the two given web resources, thereby determining an affiliation ratio t therebetween.

Generally, the respective matrices may be of different sizes. In this situation, the affiliation ratio may be calculated as a ratio between the number of matched distinctive attributes associated with the given resource to a number of distinctive attributes associated with one of the plurality of web resources having a smallest pattern.

In some non-limiting embodiments of the present technology, the computing device 600 may be configured to apply the cross-correlation technique simultaneously for at least some of the plurality of web resources. In other non-limiting embodiments of the present technology, the computing device 600 may be configured to apply the cross-correlation technique stepwise to each pair of the plurality of web resources.

Thus, by doing so, according to certain non-limiting embodiments of the present technology, the computing device 600 may be configured to generate the plurality of clusters for grouping therein the plurality of web resources.

The method 200 hence advances to step 250.

Step 250: Storing an Indication of the Plurality of Clusters of Web Resources in the Memory Finally, according to certain non-limiting embodiments of the present technology, at step 250, the computing device 600 may be configured to store the plurality of clusters of the web resources in one of the database of web resources associated with the computing device 600 and the internal database of the system 100.

The method 200 hence terminates.

Figure 5:
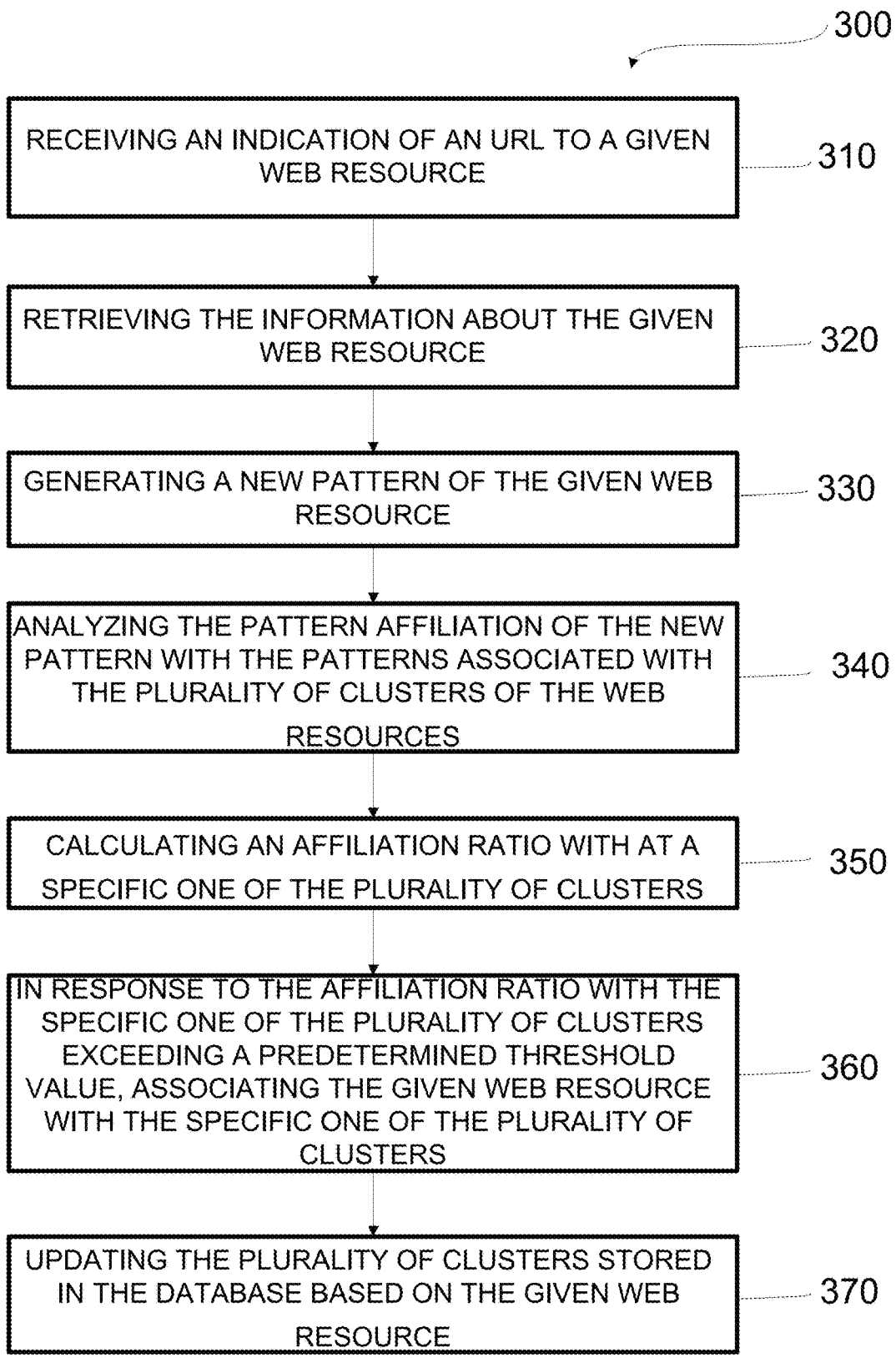
FIG. 5 depicts a flowchart diagram of a method for determining an affiliation of a new resource to the clusters of web resources generated in accordance with the method of FIG. 2, in accordance with certain non-limiting embodiments of the present technology.

According to certain non-limiting embodiments of the present technology, having generated the plurality of clusters for the plurality of web resources, the computing device 600 may further be configured to determine affiliation of a new web resource to the so identified plurality of clusters. To that end, the computing device 600 may be configured to execute a method 300, a flowchart diagram of which is depicted in FIG. 5.

Step 310: Receiving an Indication of an Url to a Given Web Resource

At step 310, the computing device may be configured to receive a new URL associated with a new web resource to be analyzed for affiliation with the plurality of clusters of the web resources. The computing device 600 may be configured to receive the new URL as described above in respect of implementation of step 210 of the method 200.

Step 320: Retrieving the Information about the Given Web Resource

Further, at step 320, information about the new web resource is retrieved. Based on this information, the computing device 600 may be configured to identify distinctive attributes associated with the new web resource in a fashion similar to that described above with respect to step 220 of the method 200.

Step 330: Generating a New Pattern of the Given Web Resource

Based on the received information, at step 330, the computing device 600 may further be configured to generate a new pattern associated with the new web resource located under the new URL link received at step 310 of the method 300.

Step 340: Analyzing the Pattern Affiliation of the New Pattern with the Patterns Associated with the Plurality of Clusters of the Web Resources Thus, at step 340, the computing device 600 may be configured to analyze the new pattern against each one of the respective patterns associated with the plurality of web resources stored in the database of web resources associated with the computing device 600 and having been identified via execution of the method 200.

Step 350: Calculating an Affiliation Ratio with at a Specific One of the Plurality of Clusters At step 350, the computing device 600 may be configured to calculate a respective affiliation ratio between the new pattern and those associated with the plurality of clusters.

Step 360: In Response to the Affiliation Ratio with the Specific One of the Plurality of Clusters Exceeding a Predetermined Threshold Value, Associating the Given Web Resource with the Specific One of the Plurality of Clusters Further, at step 360, in response to a given affiliation ration, between the new pattern and that of a specific one of the plurality of clusters exceeds a predetermined threshold value, the computing device 600 may be configured to determine the new pattern and the new web resource associated therewith as being affiliated with the specific one of the plurality of clusters. Conversely, if the respective affiliation ratio does not exceed the predetermined threshold value, the new pattern may thus be identified as not affiliated with the specific one of the plurality of clusters.

Step 370: Updating the Plurality of Clusters Stored in the Database Based on the Given Web Resource Finally, at step 370, the computing device 600 may be configured to update the specific one of the plurality of clusters and the respective pattern associated therewith, for example, based on the distinctive attributes associated with the new web resource.

In additional non-limiting embodiments of the present technology, the computing device 600 may be configured to generate a detailed analysis report including data indicative of the affiliation of the new web resource relative to each of the plurality of clusters.

The method 300 hence terminates.

With reference to FIG. 6, there is depicted an example functional diagram of the computing device 600 configurable to implement certain non-limiting embodiments of the present technology, computing device 600

In some non-limiting embodiments of the present technology, the computing device 600 may include: one or more central processing units (CPUs) 601, at least one non-transitory computer-readable memory 602, a storage 603, input/output interfaces 604, input/output peripherals 605, connectivity hardware 606.

According to some non-limiting embodiments of the present technology, the one or more CPUs 601 may be configured to execute specific program instructions the computations as required for the computing device 600 to function properly or to ensure the functioning of one or more of its components. The one or more CPUs 601 may further be configured to execute specific machine-readable instructions stored in the at least one non-transitory computer-readable memory 602, for example, those causing the computing device to execute one of the method 200 and the method 300.

The at least one non-transitory computer-readable memory 602 may be implemented as RAM and contains the necessary program logic to provide the requisite functionality.

The storage 603 may be implemented as at least one of an HDD drive, an SSD drive, a RAID array, a network storage, a flash memory, an optical drive (such as CD, DVD, MD, Blu-ray), etc. The storage 603 may be configured for long-term storage of various data, e.g., the aforementioned documents with user data sets, databases with the time intervals measured for each user, user IDs, etc.

The interfaces input/output 604 may comprise various interfaces, such as at least one of USB, RS232, RJ45, LPT, COM, HDMI, PS/2, Lightning, FireWire, etc.

The input/output peripherals 605 may include at least one of a keyboard, joystick, (touchscreen) display, projector, touchpad, mouse, trackball, stylus, speakers, microphone, and the like. A communication link between the each one of the input/output peripherals 605 can be wired (for example, connecting the keyboard via a PS/2 or USB port on the chassis of the desktop PC) or wireless (for example, via a wireless link, e.g., radio link, to the base station which is directly connected to the PC, e.g., to a USB port).

The connectivity hardware 606 may be selected based on a particular implementation of the network 120, and may comprise at least one of: an Ethernet card, a WLAN/Wi-Fi adapter, a Bluetooth adapter, a BLE adapter, an NFC adapter, an IrDa, a RFID adapter, a GSM modem, and the like. As such, the connectivity hardware 606 may be configured for wired and wireless data transmission, via one of WAN, PAN, LAN, Intranet, Internet, WLAN, WMAN, or GSM networks.

These and other components of the computing device 600 may be linked together using a common data bus 610.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of determining an affiliation of a web resource to a plurality of clusters of web resources, the method executable by a computing device having at least a processing unit and a memory, the memory storing computer executable instructions, which, when executed, cause the processing unit to execute:
   at a training stage:
      scanning a communication network to detect a plurality of web resources;
      retrieving information associated with the plurality of web resources;
      based on the information, for each one of the plurality of web resources, generating a respective pattern,
         the respective pattern for a given web resource of the plurality of web resources including data indicative of at least one of a position and a size of at least one page block within at least one page of the given web resource;
      based on the respective patterns, grouping the plurality of web resources into a plurality of clusters, the grouping being based on a pattern affiliation between the respective patterns;
      storing an indication of the plurality of clusters of web resources in the memory;
   at a run-time stage:
      receiving an indication of an URL to a given run-time web resource;
      retrieving the information about the given run-time web resource;
      generating a new pattern of the given run-time web resource,
         the new pattern including data indicative of at least one of a position and size of at least one page block within at least one web page of the given run-time web resource;
      analyzing the pattern affiliation of the new pattern with the respective patterns associated with the plurality of clusters of the web resources;
      calculating an affiliation ratio with a specific one of the plurality of clusters;
      in response to the affiliation ratio with the specific one of the plurality of clusters exceeding a predetermined threshold value, associating the given run-time web resource with the specific one of the plurality of clusters; and
      updating the plurality of clusters stored in the database based on the given run-time web resource.

2. The method of claim 1, wherein the respective pattern comprises a matrix of distinctive attributes associated with a respective one of the plurality of web resources identified via analyzing the information associated with the plurality of web resources.

3. The method of claim 2, wherein the distinctive attributes associated with the respective one of the plurality of web resources comprise at least one of:
   a title associated with the at least one page block;
   region parameters associated with the at least one page;
   at least one target domain associated with the at least one page, including at least one of: links placed within the at least one page and transition types associated therewith, the transition types further including at least one of: a direct transition type and a redirect transition type;
   contact details;
   path patterns to respective structural elements of the at least one page and styles associated therewith; and
   names of the structural elements.

4. The method of claim 2, wherein the information associated with the plurality of web resources includes, for a given web resource, at least one of: an URL of the given web resource; an HTML code associated with the given web resource; a screenshot of at least one web page associated with the given web resource page and a hash value thereof; a date of detecting the given web resource; and domain registration data associated with the given web resource, including: a registration date, a registrar, an owner name and contact details; an IP address; an NS server; a hosting provider; a last activity date.

5. The method of claim 2, wherein the matrix of distinctive attributes contains at least one distinctive attribute associated with the respective one of the plurality of web resources.

6. The method of claim 2, wherein each of the distinctive attributes has been selected based on a pre-determined parameter R, the pre-determined parameter being indicative of a maximum threshold value for a degree of distinctiveness of a given distinctive attribute for selection thereof for the respective pattern.

7. The method of claim 6, wherein the degree of distinctiveness of the given distinctive attribute is determined based on the following inequality:

$p_i < R,$ where p is a number of web resource within the plurality of web resources associated with the given distinctive attribute.

8. The method of claim 1, wherein the calculating the affiliation ratio further comprises calculating a number of distinctive attributes associated with the given run-time web resource that are similar to those associated with the specific one of the plurality of clusters.

9. The method of claim 1, wherein the analyzing the pattern affiliation of the new pattern with the patterns associated with the plurality clusters further comprises applying a cross-correlation technique.

10. A system for determining an affiliation of a web resource to a plurality of clusters of web resources, the system comprising a computing device, the computing device further comprising:
    a processor;
    a non-transitory computer-readable medium comprising instructions;
    the processor, upon executing the instructions, being configured to:
        at a training stage:
        scan a communication network to detect a plurality of web resources;
        retrieve information associated with the plurality of web resources;
        based on the information, for each one of the plurality of web resources, generate a respective pattern,
            the respective pattern for a given web resource of the plurality of web resources including data indicative of at least one of a position and a size of at least one page block within at least one page of the given web resource;
        based on the respective patterns, group the plurality of web resources into the plurality of clusters, the grouping being based on a pattern affiliation between the respective patterns;
        store an indication of the plurality of clusters of web resources in the memory;
        at a run-time stage:
        receive an indication of an URL to a given run-time web resource;
        retrieve the information about the given run-time web resource;
        generate a new pattern of the given web resource,
            the new pattern including data indicative of at least one of a position and size of at least one page block within at least one web page of the given run-time web resource;
        analyze the pattern affiliation of the new pattern with the respective patterns associated with the plurality of clusters of web resources;
        calculate an affiliation ratio with a specific one of the plurality of clusters;
        in response to the affiliation ratio with the specific one of the plurality of clusters exceeding a predetermined threshold value, associate the given run-time web resource with the specific one of the plurality of clusters; and
        update the plurality of clusters stored in the database based on the given run-time web resource.

* * * * *